United States Patent [19]

Neudeck et al.

[11] Patent Number: 4,931,415

[45] Date of Patent: Jun. 5, 1990

[54] METAL MELTING CRUCIBLE

[75] Inventors: George W. Neudeck, West Valley; Paul H. Rieth, Hamburg, both of N.Y.

[73] Assignee: Ferro Corporation, Cleveland, Ohio

[21] Appl. No.: 191,855

[22] Filed: May 4, 1988

Related U.S. Application Data

[63] Continuation of Ser. No. 898;230, Aug. 20, 1986, abandoned.

[51] Int. Cl.$^5$ ............................................. C04B 35/14
[52] U.S. Cl. ...................... 501/133; 501/99; 501/128; 501/100; 266/275; 266/280; 266/286; 427/376.2; 428/34.4; 428/34.6
[58] Field of Search ................. 501/99, 133, 128, 100; 266/275, 280, 286; 373/156, 163; 427/376.2; 428/34.4, 34.6

[56] References Cited

U.S. PATENT DOCUMENTS

| | | | |
|---|---|---|---|
| 2,270,199 | 1/1942 | Thrune | 501/99 X |
| 2,772,176 | 11/1956 | Leitten | 501/100 |
| 3,140,193 | 7/1964 | Kane | 427/376.2 |
| 3,249,460 | 5/1966 | Gerry | 427/376.2 |
| 3,409,451 | 11/1968 | Zeitsch | 501/99 |
| 3,682,839 | 8/1972 | Galloway | 501/99 |
| 4,471,059 | 9/1984 | Yoshino et al. | 501/99 |

FOREIGN PATENT DOCUMENTS

| | | | |
|---|---|---|---|
| 2141494 | 3/1976 | Fed. Rep. of Germany | 501/133 |
| 215074 | 10/1984 | German Democratic Rep. | 501/99 |
| 46-98822 | 3/1971 | Japan | 501/99 |
| 59-131563 | 7/1984 | Japan | 501/99 |
| 59-146970 | 8/1984 | Japan | 501/99 |
| 60-51671 | 3/1985 | Japan | 501/99 |
| 212535 | 2/1968 | U.S.S.R. | 501/99 |
| 1058204 | 2/1967 | United Kingdom | 501/133 |

Primary Examiner—William R. Dixon, Jr.
Assistant Examiner—Deborah Jones
Attorney, Agent, or Firm—D. Peter Hochberg; Mark Kusner; Louis J. Weisz

[57] ABSTRACT

There is disclosed a raw composition, as well as a fired shape, known in the art as a clay-bonded graphite crucible for melting metals, which contains a quantity of fused silica and is particularly adaptable to melting metals in high-energy, induction furnaces.

8 Claims, No Drawings

METAL MELTING CRUCIBLE

This is a continuation of co-pending application Ser. No. 898,230 filed on Aug. 20, 1986 now abandoned.

This invention is directed to a clay-bonded graphite crucible used to melt metals, which crucible is particularly adapted to be utilized in conjunction with a high-energy, induction furnace.

Specifically, the present invention involves an improved crucible body composition which comprises a relatively high percentage of fused silica grog, introduced as such into the raw batch of the crucible body prior to firing to maturity, and a major portion of which retains its identity as such in the finished, fired crucible.

The methods of manufacturing crucibles of this general type are well-known, and are commonly made of flake graphite bonded with clay, or carbon introduced in the mix as tar or pitch, all generally made by the methods broadly disclosed in U.S. Pat. Nos. 1,356,939; 1,458,724; 1,458,726 and 1,479,107.

BACKGROUND OF THE INVENTION:

Current foundry practice utilizes induction furnaces to melt and hold metals; consequently, greater demands than ever have been made upon both the induction furnace manufacturer, as well as the crucible producer, to provide equipment which will melt at faster rates. To help meet these demands, newer, higher powered high frequency furnaces are now available having a frequency range of 1000 to 3000 Hertz. These operating conditions have a devastating effect on crucible compositions which are unable to repeatedly withstand such severe treatment. That is, some crucible compositions might tend to have too high electrical conductivity, thereby causing heating at such a rapid rate that the crucibles develop isolated hot spots, blister, shatter, or become just too hot to meet the operating requirements of a given foundry. Too high thermal conductivity can result in excessive metal temperature, heat loss during the pouring operation, and can also cause the crucible to become too hot to meet the operating requirements of a given foundry.

On the other hand, crucibles having too low electrical conductivity, also have a low susceptibility to the induction field, therefore tend to crack as a result of thermal gradients in the crucible. These are caused by the combination of the molten metal level and induction field, promoting uneven heating between the midwall of the crucible and its top and bottom sections. Furthermore, crucible compositions with too low susceptibility to the electrical field heat up at too slow a rate, and therefore contribute less to the melt rate of the charge.

It has been found that the crucible compositions disclosed below, and which form the basis for this invention, have the optimum levels of higher electrical resistivity, lower susceptibility to the induction field, lower thermal conductivity, and lower thermal expansion. This combination reduces the likelihood of the crucible failing due to thermal shock, blistering, or overheating while at the same time maintaining the desired melt rate with minimum heat losses during the pouring operation.

Following modern practice, particulate raw materials are dry blended, then, in the case of a clay-bonded crucible, such as this invention deals with, are mixed with 7 to 20% by weight water. The "soft mud" mix is then formed or molded into crucibles by any one of several acceptable means, such as mechanical pressing, jiggering, spinning, hand ramming or isostatic pressing. All these processes are currently in use by the crucible manufacturing industry, and are considered to be conventional ceramic processes.

Following forming, the crucibles are then dried, and may be covered with any one of a wide variety of glaze coatings to prevent oxidation of the graphite during initial firing, or when subsequently used by the consumer. However, one of the unexpected advantages of the crucible of the instant invention is that its useful life can be greatly enhanced by the controlled oxidation of the internal crucible surface during manufacturing. This is accomplished by eliminating the conventional glaze on the interior of the crucible, prior to firing, and applying a coating which will retard deep oxidation, yet at the same time permit a thin film of surface oxidation to occur. This is accomplished by coating the dried crucible interior with an engobe which contains about 30 to 50% by weight silicon metal, 20 to 60% by weight of ball clay and 0 to 50% clay-graphite random fines collected from the mixing operation of the main body. The engobe coating is applied to a thickness of between 0.005" and 0.040". Upon firing, there results a slightly oxidized layer consisting mostly of silica, on the crucible interior, which becomes an integral part of the crucible. The depth of the oxidized layer can range from 0.06" to 0.25".

More particularly, the oxidized layer induced as described above is composed of the same raw materials as the main body, with the exception that the carbon from the graphite has been burned out through oxidation, leaving a porous carbon-free structure which serves as an electrical insulator between the metal and the main crucible body composition, and which also serves to further reduce the thermal conductivity between the two.

Whether glazed inside and out, or whether glazed only on the outside, with an oxide-producing engobe on the inside, the crucibles are fired, following drying, to a temperature in the range of 1250° to 1550° C. The preferred firing temperature is 1400° C., or about cone 14, in an oxidizing atmosphere. Regardless, any composition as disclosed hereinafter, may be fired, following minor trial and error, at a temperature sufficient to partially vitrify the clay so as to form the bond necessary to obtain sufficient mechanical strength to hold the crucible together. At the same time, firing is on a fairly rapid schedule so as to minimize crystallization or devitrification of the fused silica. At 1400° C., the preferred firing schedule would be one completed in about twenty-four hours, held at peak temperature briefly, then permitted to cool back down to room temperature in about sixteen hours.

PREFERRED EMBODIMENTS:

Exemplary of specific compositions which I have found to provide the optimum combination of susceptibility and thermal shock resistance in fired, clay-bonded crucibles, are the following raw batches.

TABLE 1

|  | Wt. % | | | | |
| --- | --- | --- | --- | --- | --- |
|  | 1 | 2 | 3 | 4 | 5 |
| Fused Silica | 20 | 25 | 25 | 30 | 40 |
| Natural Flake Graphite | 40 | 30 | 25 | 30 | 20 |
| Ball Clay | 35 | 35 | 40 | 32 | 25 |
| Bentonite | 0 | 2 | 0 | 0 | 5 |
| Silicon Carbide Fines | 0 | 4 | 10 | 0 | 0 |

TABLE 1-continued

| | Wt. % | | | | |
|---|---|---|---|---|---|
| | 1 | 2 | 3 | 4 | 5 |
| Silicon Metal | 5 | 4 | 0 | 8 | 10 |
| Total | 100 | 100 | 100 | 100 | 100 |

Exemplary of the raw materials set forth in the foregoing table, the graphite is a natural Madagascar flake, which has a 20 to 80 mesh sizing with a minimum carbon content of 80%. However, sizing could vary from a large flake of from 10 to 30 mesh to a fine flake of from 50 to 200 mesh with carbon contents of 75% or higher.

With respect to the ball clays, various domestic ball clays may be used, having a particle size of more than 95% minus 20 microns.

Bentonite used in the preferred embodiments set forth above, is a familiar raw material to the Ceramic Industry. It is a natural clay-like substance, a hydrous silicate of alumina comprised essentially of the clay mineral, Montmorillonite.

The SiC fines utilized were greater than 85% finer than 44 microns.

The fused silica is commercially available from any number of sources, is essentially noncrystalline and amorphous, preferably ranges between from 4 mesh and 100 mesh with at least 50% coarser than 30 mesh, the following being a guide to the mesh sizes preferred: 4 mesh=4760 micron, 30 mesh=590 micron, 100 mesh=149 micron. The coarse material is required so as to minimize devitrification of the fused silica during the operation whereby the crucible is fired to maturity, as well as in subsequent use by the foundry operator.

The silicon metal utilized had a fines distribution of 90% finer than 100 mesh and at least 50% finer than 200 mesh.

Utilizing the manufacturing techniques outlined above, and firing the crucibles to maturity at 1400° C., the following Table 2 lists the approximate composition of the respective crucibles derived from the batch compositions set forth above in Table 1.

TABLE 2

| | Wt. % | | | | |
|---|---|---|---|---|---|
| | 1 | 2 | 3 | 4 | 5 |
| Fused Silica | 21 | 26 | 26 | 31 | 41 |
| Carbon | 36 | 27 | 22 | 26 | 18 |
| Crystalline Silica | 23 | 24 | 26 | 21 | 19 |
| Alumina | 12 | 12 | 13 | 11 | 9 |
| Silicon Carbide | 0 | 4 | 10 | 0 | 0 |
| Silicon | 5 | 4 | 0 | 8 | 10 |
| Miscellaneous Impurities | 3 | 3 | 3 | 3 | 3 |
| Total | 100 | 100 | 100 | 100 | 100 |

The "Miscellaneous Impurities" are random, insignificant oxides derived from the ball clay, bentonite and silicon carbide fines.

Under production conditions, the crucibles manufactured having the composition set forth in Table 2 performed in a far superior manner compared to crucibles produced without the addition of fused silica within the ranges set forth above.

While the novel compositions of this invention find their widest application in the form of metal melting crucibles, it is anticipated they would have potential application in just about any shape used in conjunction with metal melting. Therefore, it is contemplated that the foregoing compositions would apply to any formed, clay-bonded refractory, fired to a predetermined shape.

Furthermore, although optimum results are obtained with these fired compositions as set forth under Table 2 above, fired compositions having any measurable amount of fused, amorphous, noncrystalline $SiO_2$ would represent a decided improvement, for the particular applications outlined above, as compared to a clay-bonded crucible containing no fused $SiO_2$. By "measurable amount," is meant any amount equal to or greater than amounts which might normally be present as miscellaneous impurities, i.e. a minimum of 3 wt. %, either of the raw batch, or of the fired crucible composition.

We claim:

1. A fired, metal melting, clay-bonded graphite crucible for melting metals in a high frequency, induction furnace and having an interior surface, said crucible having the following composition:

| | Weight Percent |
|---|---|
| Fused Silica | 3 to 41 |
| Carbon | 18 to 36 |
| Crystalline Silica | 19 to 26 |
| Alumina | 9 to 13 |
| Silicon Carbide | 0 to 10 |
| Silicon | 0 to 10 | the foregoing components totaling 100, as they vary within their respective ranges, said crucible including an applied oxidized coating substantially comprising silica on the interior surface thereof, said coating providing a porous, carbon-free, slightly oxidized layer made from up to 50% silicon metal and up to 60% ball clay on the crucible interior surface which oxidized layer is an integral part of said crucible and which is between about 0.06 inch and 0.25 inch deep.

2. The crucible of claim 1 containing from about 21 to about 41 weight percent fused silica.

3. A fired, clay-bonded graphite crucible, for melting metals in a high frequency, induction furnace, said crucible being formed from a raw batch composition comprising:

| | Weight Percent |
|---|---|
| Fused Silica | 3 to 40 |
| Natural Flake Graphite | 20 to 40 |
| Ball Clay | 25 to 40 |
| Bentonite | 0 to 5 |
| Silicon Carbide Fines | 0 to 10 |
| Silicon Metal | 0 to 10 |
| Miscellaneous Impurities | 0 to 3 | the foregoing components totaling 100 parts by weight as they vary within their respective ranges, and said crucible having an interior surface coated prior to firing with a graphite-containing engobe comprising:

| | Weight Percent |
|---|---|
| Silicon Metal | 30 to 50% |
| Ball Clay | 20 to 60% |
| Clay-Graphite Random Fines | 0 to 50% | the components of said engobe also totalling 100 parts as they vary within their respective ranges, whereby upon firing said crucible having a coating on an interior surface will have a porous, carbon-free, slightly oxidized layer on its interior surface which oxidized layer is an integral part of said crucible and which is between about 0.06 inch and 0.25 inch deep.

4. The fired refractory crucible of claim 3, wherein the fused silica is present in from about 20 to about 40 parts by weight.

5. The crucible of claim 3, wherein said engobe is applied to a thickness of between about 0.005 inch and 0.040 inch.

6. The crucible of claim 3, wherein said engobe further includes 0 to 50 weight percent clay-graphite random fines collected from the manufacture of the crucible composition.

7. The crucible of claim 3, wherein said firing is conducted in the range of 1250° C. to 1550° C.

8. The crucible of claim 3, wherein said firing is conducted in an oxidizing atmosphere.

* * * * *